No. 793,221. Patented June 27, 1905.

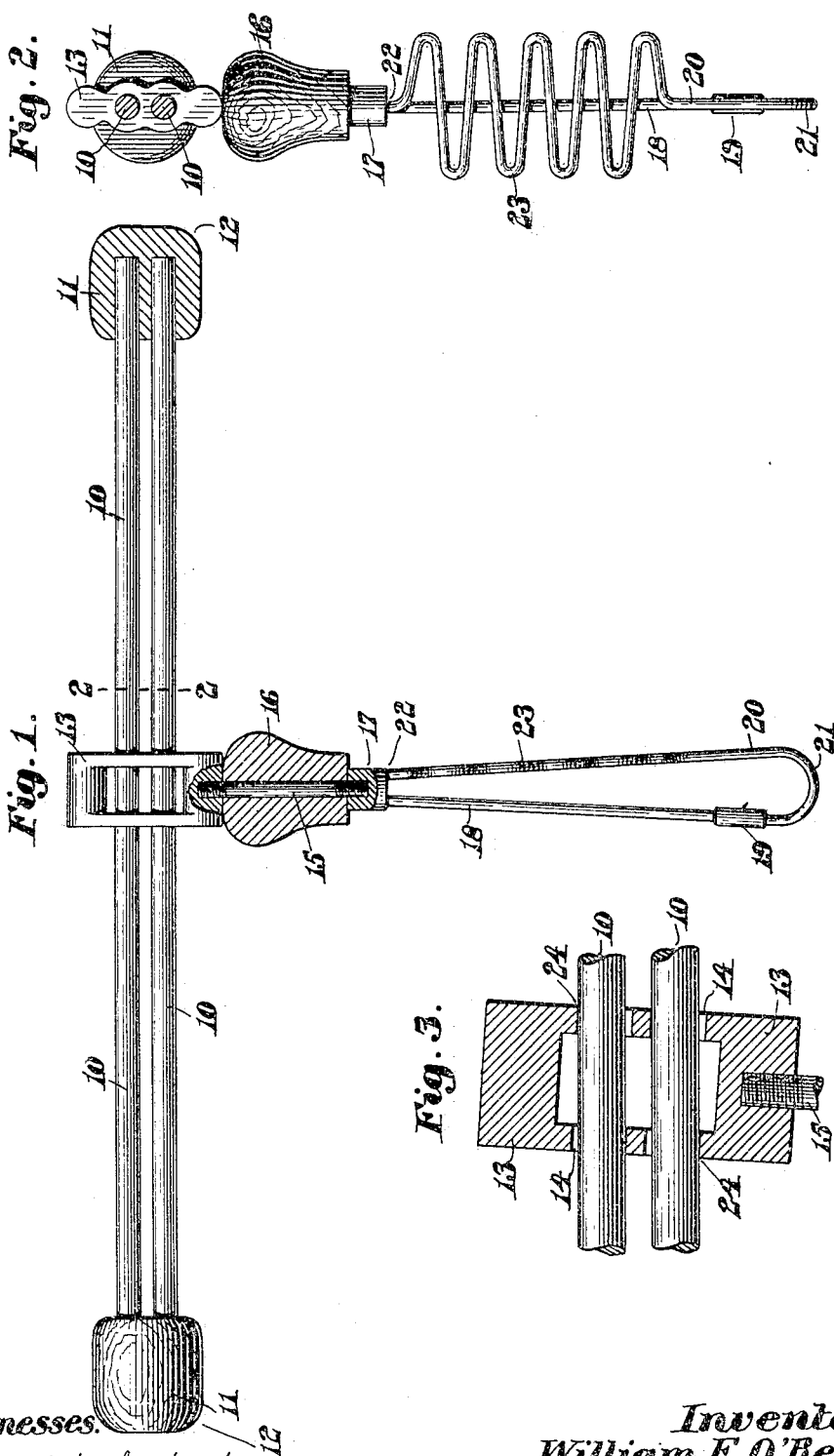

UNITED STATES PATENT OFFICE.

WILLIAM E. O'REILLY, OF BROCKTON, MASSACHUSETTS.

VIBRATOR.

SPECIFICATION forming part of Letters Patent No. 793,221, dated June 27, 1905.

Application filed November 3, 1904. Serial No. 231,187.

*To all whom it may concern:*

Be it known that I, WILLIAM E. O'REILLY, a citizen of the United States of America, and a resident of Brockton, in the county of Plymouth, in the State of Massachusetts, have invented certain new and useful Improvements in Vibrators, of which the following is a specification.

This invention relates to vibrators, and particularly to that class of vibrators which are intended for use to assist in the circulation of the blood in the human body.

It consists in certain novel features of construction and arrangement of parts, which will be readily understood by reference to the description of the drawings and to the claims to be hereinafter given.

Of the drawings, Figure 1 represents a side elevation of a device embodying the features of this invention, said figure being shown partly in section. Fig. 2 represents a transverse sectional elevation of the same, the cutting-plane being on line 2 2 on Fig. 1; and Fig. 3 represents a sectional elevation of the traveler mounted upon the vibrating rods, said traveler being shown in its operating position.

Similar characters designate like parts throughout the several figures of the drawings.

In the drawings, 10 represents two parallel metallic rods the ends of which are connected together by cylindrical members 11, of wood, the ends of which are preferably rounded, as at 12. Upon the rods 10 is mounted a traveler 13, provided with openings 14, through which said rods pass. These openings 14 are slightly larger than the rods 10, so that the traveler may be freely moved lengthwise thereof when said traveler is at right angles thereto. The traveler 13 is provided with a shank 15, upon which is mounted a handle 16, preferably made of wood or other nonmetallic substance and by which said traveler is operated. The outer end of said shank 15 has secured thereto a nut 17, said nut being provided with a wire 18, substantially parallel with said shank 15 and extending some distance from said nut. The outer end of this wire has coupled thereto at 19 a second wire 20, provided with a return-loop 21, the opposite end of which is connected at 22 to said nut 17. The wire 20 between the loop 21 and the point 22 is bent to form a series of zigzag sections 23.

To operate this vibrator, one of the end sections 11 is held against the part of the body affected either by rheumatic pains or lack of circulation of the blood, and the handle 16 is grasped in such a manner as to incline the traveler 13 so that the corners 24 around the holes 14 will come into contact with the rods 10. If the traveler is moved lengthwise of the rods while in this inclined position, the parts 24, contacting with the rods 10, will cause the angle of said traveler to be rapidly changed, and the rods 10 will be energetically vibrated, the vibration being transmitted through the ends 12 to that portion of the body in which said ends 11 are in contact. The zigzag sections 23 will be caused to vibrate rapidly as the traveler 13 is moved back and forth along the rods 10. The vibration of the zigzag sections 23 will be transmitted through the traveler to the rods 10 and materially increase the vibrations thereof. The zigzag sections 23 are preferably at right angles to the rods 10, as shown in the drawings, as in this position the vibrations thereof are increased.

By the use of this device properly used the circulation of the blood may be materially improved and pains caused by a lack of proper circulation will be wholly removed from the system.

Having thus described my invention, I claim—

1. The combination of two parallel rods, members connecting the ends of said rods, a traveler, a handle projecting from said traveler for moving the same along said rods, a wire extending longitudinally of said handle, and a zigzag member interposed between the end of said wire and said handle.

2. The combination of a rod, a traveler, a handle projecting from said traveler for moving the same along said rod, a wire extending longitudinally of said handle, and a zigzag member interposed between the end of said wire and said handle.

Signed by me at Boston, Massachusetts, this 31st day of October, 1904.

WILLIAM E. O'REILLY.

Witnesses:
 WALTER E. LOMBARD,
 EDWIN T. LUCE.